United States Patent
Ponsa

[15] 3,686,733
[45] Aug. 29, 1972

[54] PROCESS TO MAKE COCKS AND SPECIFICALLY WATER FAUCETS

[72] Inventor: Carlos Sauret Ponsa, 7 & 9, Calle Pelayo, Barcelona, Spain

[22] Filed: Jan. 5, 1970

[21] Appl. No.: 524

[52] U.S. Cl. ............................... 29/157.1 R, 137/606
[51] Int. Cl. ....B21d 53/00, B21k 29/00, B23p 15/26
[58] Field of Search....29/157.1 R, 157.1 A; 137/606

[56] References Cited

UNITED STATES PATENTS

| | | | |
|---|---|---|---|
| 2,869,221 | 1/1959 | Siepmann | 29/157.1 R |
| 3,448,768 | 6/1969 | Keller | 137/606 |

*Primary Examiner*—John F. Campbell
*Assistant Examiner*—Donald P. Rooney
*Attorney*—Michael S. Striker

[57] ABSTRACT

A method of manufacturing faucets, particularly washbasins and baths, includes steps of making two stainless steel plate, mirror-symmetrically shaped shell sections having abutting surfaces, which in combination form a cavity having a spout opening, an inlet opening, and lateral openings. The abutting surfaces are brought together and permanently connected by welding. A fluid supply member is soldered to the shell sections in the region of the inlet opening so that an inner portion of the supply member is located within the cavity. Hollow cylindrical valve assemblies are then inserted through the lateral openings and meshed with the end portions to fully seal the lateral opening.

8 Claims, 4 Drawing Figures

PATENTED AUG 29 1972

INVENTOR
CARLOS SAURET-PONSA

ATTORNEY

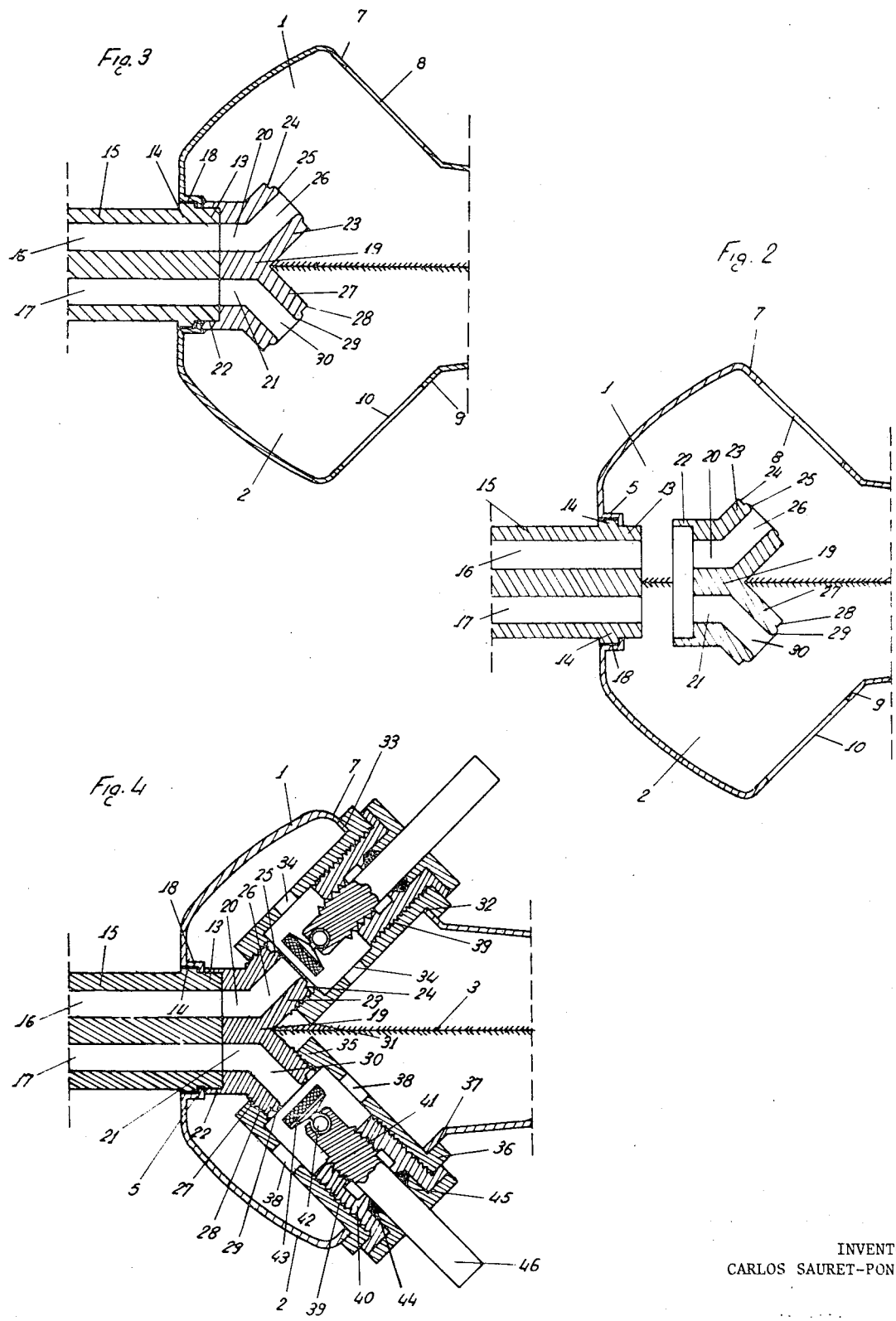

PROCESS TO MAKE COCKS AND SPECIFICALLY WATER FAUCETS

Tops for washbasins and baths, have always been known in the sense that such washbasins have, at one end a pipe through which the water escapes and, at the other end, or at some other point, a tubular prolongation, threaded beforehand, which is the point of entry of the water. A washer controls the tap with the help of a valve device that can open or close the tap for water. These taps are manufactured in cast bronze or brass requiring special moulds and, once the casting has been made, they must be subjected to further turning and milling processes in order to adjust mechanically their dimensions and shape according to the type of tap that is to be manufactured. Following this, they must be polished well so as to be nickel-plated or chromium-plated and finally joined to the valve part to be ready to function as a tap. It is clearly obvious that the manufacture of such taps is most complicated and that it requires multiple operations before being able to be considered as a finished tap, ready to be offered in sale to the public.

Furthermore, it is undoubtedly true that, manufacturing taps in accordance with traditional methods, more metal than is strictly necessary for the work must be used because it is acknowledged that castings have irregularities in their surfaces that afterwards have to be smoothed out by mechanical operations. For this reason, in the first place, they are made with dimensions greater than those strictly required so that there will be no danger of rendering them unusable because of their size after the subsequent turning and milling processes, referred to above, so that they will finish to have the correct size and possess a pleasing exterior presentation.

These inconveniences are remedied by adopting the procedure invented by me, which permits, of the tap-bodies being manufactured with stainless steel plate, manufacture which requires no further process other than that of finishing to give the desired quality of polish. Furthermore, a considerably lesser quantity or weight of metal is used, as the tap-body, as manufactured, already possesses the shape and dimensions required and does not need a very thick wall, as is so necessary in the case of taps manufactured by means of cast metal.

It is, consequently, an object of my invention to manufacture taps of the type used in baths and washbasins by producing two parts, each of which represents one-half of the tap-body, cut according to its plan of symmetry. These two parts are made with stainless steel plate and their requisite shape is given by a procedure of metal-stamping, afterwards being placed one against the other, one edge exactly facing the other for them to be arc-welded to form a single tubular body which becomes the body of the tap, though not possessing as yet the valve seats or on-off devices.

A further object of my invention is to produce such tap-bodies by first making the hollow tubular body by arc-welding the two stamped stainless steel parts, such body being flat at the back, with a wide, large orifice into which, subsequently, a tubular part of one or two ducts is fitted by silver or metal soldering, so that this duct or ducts form the means of entry/entries of the water into the body of the tap, in such a manner that a large portion of the tubular part is outside the tap-body and a short portion inside it. Inside this latter portion another metallic part is subsequently fitted, which contains the valve seating that is the main part of the device for opening and closing the flow of water to the tap, as well as constituting a means of selecting either hot or cold water.

Still another object of my invention is to produce a tap for washbasins or baths that already contains incorporated in the hollow body of the tap, made of stainless steel plate, the nozzle, that is the water outlet, and also a part with one or two ducts that become connected to the water pipe/pipes, one for hot and the other for cold water, such connexions being effected by means of soldering.

It is also an object of my invention to manufacture taps, starting with two parts obtained by mechanical stamping of stainless steel plate, which are welded together to form the hollow body of the tap itself, into which is fitted by soldering the part consisting of one or two ducts that constitute the entry of water into the tap, and which has one or two more orifices in other flat parts of the tap-body, according to whether the tap be intended for cold water only or, simultaneously, for cold and hot water. For each of these orifices there is, fitted inside the hollow body of the tap, a part which is soldered to the water duct or ducts and so forms, with the valve-seating or valve-seatings for the corresponding control/controls of flow of water that are placed on a plane parallel to the plane of the corresponding flat part of the tubular part of the tap. Into these orifices are fitted, within the hollow body itself, some cylindrical sleeves that are screw-cut and threaded peripherically into each part or parts of the piece that forms the valve-seating or valve-seatings in such manner that, having these sleeves a flange at the end that remains outside the hollow body and is supported on the peripherical zone of the orifice of the tubular body and soldered on to it. In this piece there is an on-off device that closes or opens the flow of water form the entry duct/ducts to the interior of the tubular body.

These and other objects will be made clear in the detailed description which is given in the drawings that are attached hereto.

FIG. 2 is a partial view of the same tap, with the part for the entry of water already soldered on and the piece with the valve-seatings already inserted into the hollow body, and also placed ready for insertion.

FIG. 3 is similar to FIG. 2, but shows the valve-seating part already placed in position and soldered.

FIG. 4 is similar to FIG. 1, but shows the tap completely finished, with the two close-open (on-off) valves in their place.

Figure 1:
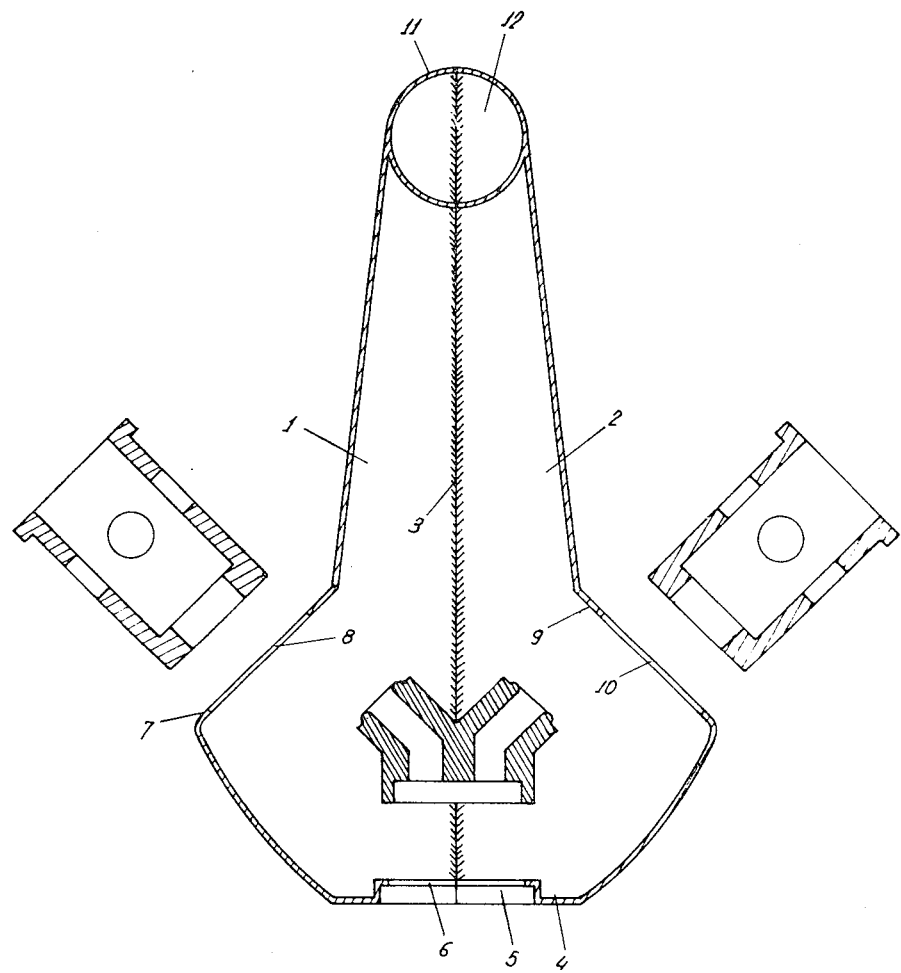
FIG. 1 shows a sectional view of the hollow body of the tap which is made from two parts of stainless steel plate, already welded together and containing the parts that together have to complete a tap for washbasins or baths. These parts are shown on the assembly drawings.

As is shown in FIG. 1, the tubular body of the tap consists of two mirror-symmetrically shaped, prefabricated, stamped shell sections 1 and 2, made of stainless steel plate 1 mm. thick, that are arc-welded together with their edges or abutting or mating surfaces in juxtaposition, their joining line being shown by the reference numeral 3 on the plan of symmetry of the hollow body of the tap to form a cavity.

In the back part 4 of this hollow body there is shown the slotted zone 5 with the wide central orifice or inlet opening 6 and, in each flat lateral zone 7 and 9, are shown the wide-diameter orifices lateral openings 8 and 10, one in each part, as can be observed, the body of the tap being completed by cutting the orifice or spout opening 12, which is the mouth through which the water flows, at the end 11.

Once the two parts 1 and 2 are welded together at 3 and the holes 6, 8 and 10, already referred to, are made, the front end 13 of the bi-tubular part or fluid supply member 15 is inserted through the orifice 6 until its flange 14 is inside the slotted zone 5, to be then welded with silver or bronze solder which fills the clearance between them, shown by 18, so that the body is as shown in FIG. 2, i.e. with the front end 13 inside the hollow end of the tap and the back part outside it, this latter serving for the purpose of fixing the tap in the wall or washbasin, as is the usual practice with cast-metal taps, and afterwards the ducts 16 and 17 are soldered to the hot and cold water fittings.

The inner end portion 19, of the fluid supply member 15, which has the two ducts 20 and 21, is inserted into one or other of the orifices 8 or 10 and so enters the hollow body of the tap formed by parts 1 and 2. In its back part there is the peripheric flange suitable for being joined, either by the threading or by welding, on to the interior end 13 of the double-entry duct. In this way, as shown in FIG. 3, duct 20 communicates with duct 16, and duct 21 with duct 17. This part 19 is extended in such a way that the two ducts remain with their center-lines perpendicular and outer faces 23 and 27 are provided with thread-pitch. Duct 23, which is the extension of duct 20, has flange 25 at its end 24, so acting as a valve-seating, and duct 27, which is the extension of duct 21, has flange 29 at its end 28 and so similarly acts as valve-seating. In this manner ducts 26 and 30 are perpendicular, duct 26 being axially aligned with orifice 8 and duct 30 axially aligned with orifice 10, as is shown in FIG. 3.

Once the parts have been welded and fixed into place (see FIG. 3), the hollow cylindrical valve assembly 31 is inserted through orifice 8. This hollow cylindrical valve assembly 31 is threaded by the lower part of its interior facing into the tubing 23. This same hollow cylindrical valve assembly 31 has, at its upper end 32, the outlet step or flange 33 which, when the lower end has been threaded into the tubing 23, remains supported on the exterior wall of the hollow body of the tap, exactly on the peripheric exterior zone 7 of the orifice 8 and is then welded on to this peripheric zone so that leakages of water may not take place. The open-close (on-off) device is inserted by threads inside this hollow cylindrical valve assembly 31, as is described later, and orifices 34 are made in its lateral facing so that the water which flows by 16 to 26 passes through them to the interior of the body of the tap and leaves by the nozzle 12 at its end 11 (see FIG. 1). In the other corresponding portion 27, hollow cylindrical values assembly 35, which is similar to the aforementioned hollow cylindrical valve assembly 31 and also has at its end 36 the flange 37 that is supported and soldered on to 9, is also inserted by threading. It likewise has the passing orifices 38.

once the tap has been assembled in the manner described, the open-close (on-off) elements are fitted. They are of the type generally in use for valves not only of this but of other types used in plumbing work, and for that reason the interior faces of the hollow cylindrical valve assemblies 31 and 35 (see FIG. 4) are threaded by the zone 39 and, in this threading, the open-close (on-off) device formed by the sleeve 40 which, by a very large thread screw is joined to the stem 41 for control of the valve. The valve, in this way, becomes moveable in axial direction. This stem or spindle has the open-close 43 at the end which, in turn, is joined by the small ring-washer 42 for the application of the open-close device 43 on the valve-seating 29, a perfect air and water-tight seal being thereby obtained whenever the spindle 41 is turned towards the open-close 43 in the direction of the valve-seating 29. The open-close (on-off) device 43 has the stop 44 for air-tightness and gland 45 for preventing leakages of water at the spindle 46, to which the fly-wheel is fitted so as to control the valve, in the manner that is usual for such cases.

I hereby lay claim to:

1. A method of manufacturing taps, particularly for washbasins and baths, comprising the steps of making two mirror-symmetrically shaped shell sections having mating surfaces and which, in combination, form a cavity having a spout opening and an inlet opening, at least one of said shell sections having a lateral opening; mating said mating surfaces to form said cavity; permanently connecting said two shell sections along said mating surfaces in fluid-tight relationship; sealingly connecting with said inlet opening a fluid-supply member with an inner end portion of said member being located within said cavity; inserting a hollow cylindrical valve assembly through said lateral opening; and connecting said valve assembly to said inner end portion and to said one shell section to fully seal said lateral opening.

2. A method as defined in claim 1, wherein the step of sealingly connecting said fluid-supply member comprises inserting said member through said inlet opening to locate said inner end portion within said cavity; and connecting said member to said shell sections to fully seal said inlet opening.

3. A method as defined in claim 1, wherein said fluid supply member comprises two portions, one portion being provided with said end portion, wherein the step of sealingly connecting said fluid-supply member comprises passing said one portion through said lateral opening; engaging said two portions in the region of said inlet opening; and connecting each of said portions to said shell sections to fully seal said inlet opening.

4. A method as defined in claim 1, wherein the step of making said shell sections comprises tamping stainless steel plate.

5. A method as defined in claim 1, wherein the step of permanently connecting said two shell sections comprises welding said sections along their mating surfaces.

6. A method as defined in claim 1, wherein the step of connecting said fluid-supply member comprises soldering said member to said shell sections in the region of said opening.

7. A method as defined in claim 1, wherein the step of connecting said valve assembly to said end portion comprises meshing corresponding threaded portions provided on said valve assembly and said end portion.

8. A method as defined in claim 1, wherein said step of connecting said valve assembly to said one shell section comprises welding said valve assembly to said one shell section in the region of said lateral opening.

\* \* \* \* \*